United States Patent

Perkins et al.

(10) Patent No.: US 9,106,526 B2
(45) Date of Patent: Aug. 11, 2015

(54) TRAVERSING FIREWALLS

(75) Inventors: Gregory Eugene Perkins, Boise, ID (US); Curtis Reese, Boise, ID (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 2612 days.

(21) Appl. No.: 10/394,643

(22) Filed: Mar. 21, 2003

(65) Prior Publication Data

US 2004/0187028 A1    Sep. 23, 2004

(51) Int. Cl.
*G06F 9/00*        (2006.01)
*H04L 12/24*       (2006.01)
*H04L 29/06*       (2006.01)

(52) U.S. Cl.
CPC .............. *H04L 41/08* (2013.01); *H04L 41/026* (2013.01); *H04L 63/02* (2013.01); *H04L 41/0213* (2013.01)

(58) Field of Classification Search
CPC ....... H04L 63/029; H04L 63/02; H04L 41/08; H04L 41/026; H04L 41/0213; G06F 3/12; G06F 12/0646; G06F 3/1285; G06F 2009/45591; G06F 3/1258
USPC ...................................... 726/11, 2
See application file for complete search history.

(56) References Cited

U.S. PATENT DOCUMENTS

| 5,220,674 | A  |   | 6/1993  | Morgan |
|-----------|----|---|---------|--------|
| 5,727,135 | A  |   | 3/1998  | Webb |
| 5,887,216 | A  | * | 3/1999  | Motoyama ........................ 399/8 |
| 5,909,493 | A  |   | 6/1999  | Motoyama |
| 5,950,157 | A  |   | 9/1999  | Heck |
| 5,970,446 | A  |   | 10/1999 | Goldberg |
| 5,991,807 | A  |   | 11/1999 | Schmidt |
| 6,148,346 | A  |   | 11/2000 | Hanson |
| 6,202,081 | B1 | * | 3/2001  | Naudus ......................... 709/200 |
| 6,219,706 | B1 |   | 4/2001  | Fan |
| 6,349,336 | B1 | * | 2/2002  | Sit et al. ........................ 709/227 |
| 6,411,930 | B1 |   | 6/2002  | Burges |
| 6,453,127 | B2 |   | 9/2002  | Wood |
| 6,473,788 | B1 |   | 10/2002 | Kim |
| 6,574,675 | B1 | * | 6/2003  | Swenson ....................... 719/316 |
| 6,857,013 | B2 |   | 2/2005  | Ramberg |
| 6,978,383 | B2 | * | 12/2005 | Boyle et al. ..................... 726/15 |
| 2003/0061511 | A1 | * | 3/2003 | Fischer ......................... 713/201 |
| 2004/0098400 | A1 | * | 5/2004 | Landau et al. ................. 707/100 |
| 2004/0139350 | A1 | * | 7/2004 | Lyon et al. .................... 713/201 |

FOREIGN PATENT DOCUMENTS

EP    0859309 A2    8/1998
EP    0943987 A1    9/1999

* cited by examiner

*Primary Examiner* — Ali Abyaneh
(74) *Attorney, Agent, or Firm* — Mahamedi Paradice LLP

(57) ABSTRACT

Traversing a firewall. A method embodiment includes receiving, from behind the firewall, an electronic mail message with instructions to establish a connection with a device located outside the firewall. A connection is then established through the firewall with the device outside the firewall according to the instructions in the electronic mail message.

18 Claims, 4 Drawing Sheets

TRAVERSING FIREWALLS

BACKGROUND

This invention relates to remotely establishing network communications. More particularly, the invention is directed to traversing a network firewall to effect network communications where such activity would be otherwise frustrated by common security configurations.

Generally speaking, a computer network is made up of a number of interconnected devices such as desktop computers, servers, and peripherals including printers, copiers, scanners, fax machines, multifunction devices, and electronic storage devices. Each device has a number of settings to be configured from time to time. These settings include IP (Internet Protocol) addresses; subnet masks; IP gateway addresses; proxy server assignments; community names; device passwords; location descriptions; system contact; frame type selections; protocol stack selections; print resolution; duplexing; and paper tray selection just to name a few. A single setting for certain attributes, such as the IP gateway and subnet mask, may be applied across multiple devices. For devices such as printers, different settings for paper tray output and print resolution are applied to each device individually. Many network devices such as printers also have operating parameters that can be monitored. Examples of operating parameters include toner levels, number of pages printed, and the current operational status of the device.

In the past, configuration required physically accessing each device and entering the desired settings though a control panel or other interface provided by the device. As the number of devices on the network increases, so does the difficulty in managing the configuration of the devices. This is especially true as the geography of the network expands. In today's businesses, it is not uncommon for a network to expand across buildings, across states, or even across countries—making physical access to many devices difficult if not impossible. Consequently, methods and systems have evolved for remotely accessing and configuring network devices.

One solution involves embedding a web server in each device for managing the configuration of that device. Using a conventional web browser, a system administrator can browse to the address of a particular device. The embedded web server returns a web page allowing the administrator to select configuration settings for that device. While this allows remote configuration, it requires the administrator to manually browse to and configure each device one at a time.

A second solution involves placing network devices under the control of a device management application such as Hewlett-Packard Company's "Web JetAdmin"®. The software is usually installed on a network server or workstation. Using a conventional browser, a system administrator can browse to the device management application which in turn communicates with network devices allowing the administrator to monitor operating parameters as well as select the configuration settings to be applied to a device individually or to a group of devices simultaneously.

From within a local network, using a browser to access a web server embedded in a device or to access a device management application is relatively simple. Each is typically accessed through a private IP (Internet Protocol) address. It is often desirable to monitor or configure a device from outside the local network. However, a firewall is often employed that prevents a browser from establishing a connection from outside the local network. A firewall often implements network proxies as a kind of one-way door through the firewall between the local network and the Internet. Browsers and other applications are allowed to initiate outbound connections, but outside browsers and other applications are generally not allowed to initiate inbound connections. A prominent exception to this pattern is electronic mail messages, which are typically allowed to flow freely in both directions.

For example, a business may lease a multifunction network peripheral such as a digital copier/printer/scanner from an office supply service. The business connects the device to its local network. The device includes an embedded web server that enables it to be configured and monitored remotely. Under the terms of the lease, the office supply service may be responsible for supplying toner and maintaining the device. However, the business employs a firewall to protect its local network. That firewall prevents the office supply service from accessing the device from outside the local network thus increasing the costs involved with maintaining the device.

DETAILED DESCRIPTION OF THE INVENTION

Firewalls perform an important function when protecting local area networks from outside intrusions. However, by blocking communications originating outside the local area network, a firewall sometime blocks desirable network activities. Embodiments of the present invention will enable a remote device to initiate a network connection with a device operating behind a firewall.

The following description is broken into sections. The first section describes an environment in which embodiments of the present invention may be implemented. The second section describes the physical and logical components used to implement embodiments of the present invention. The third section describes steps taken to practice embodiments of the present invention.

Figure 1:
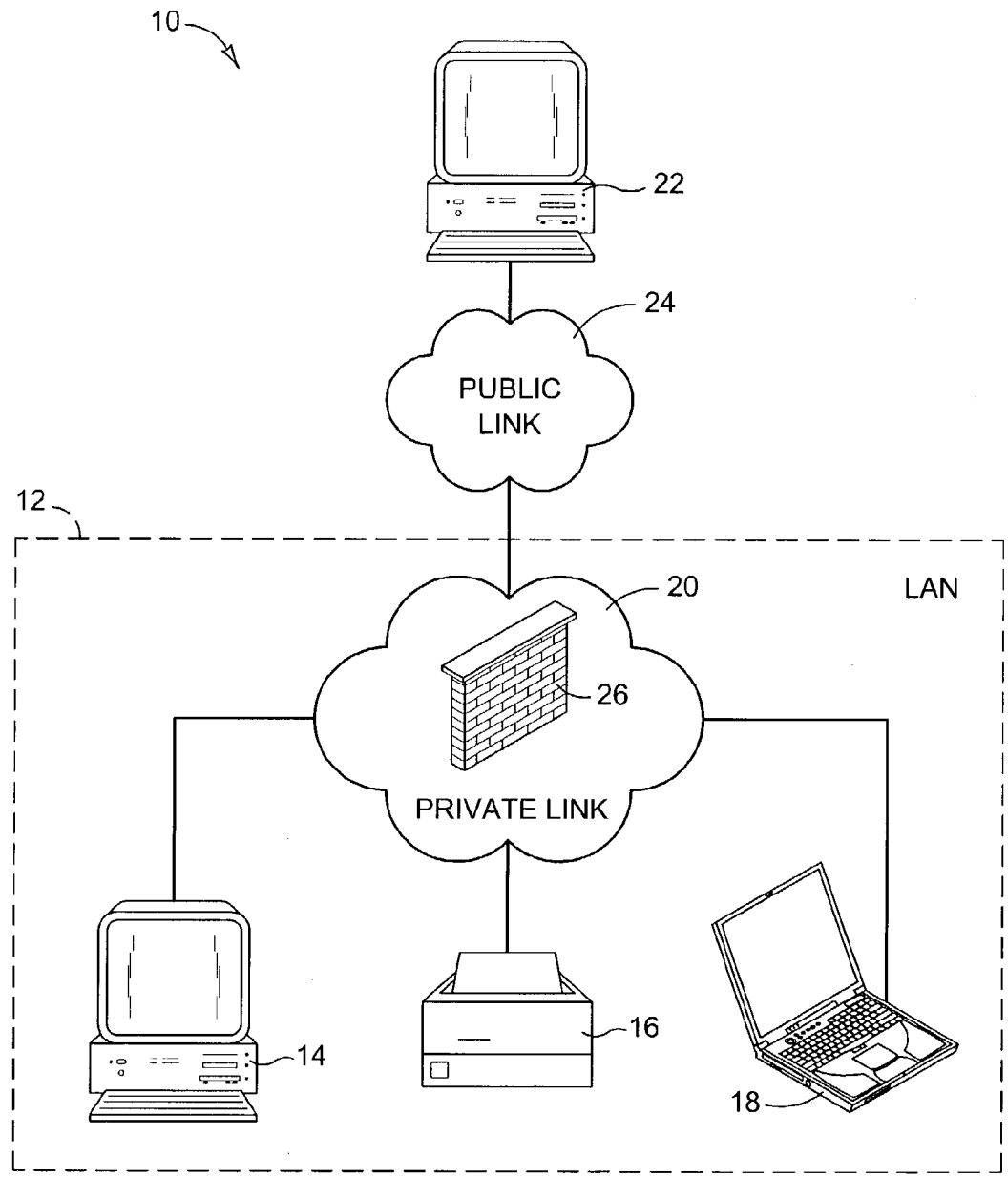
FIG. 1 is a schematic representation of a network environment in which embodiments of the present invention may be implemented.

Environment:

FIG. 1 illustrates a network environment 10 in which it would be advantageous to implement embodiments of the present invention. Environment 10 includes LAN (Local Area Network) 12. LAN 12 represents generally any private network and includes desktop computer 14, printer 16, and laptop computer 18. Devices 14-18 are interconnected by private link 20. Devices 12-14 can be referred to as state machines.

In general, a state machine is any device that stores the status of something at a given time and can operate on input to change the status and/or cause an action or output to take place for any given change. Instructions, such as printing instructions sent to printer 16, is input that changes one or more states of printer 16 and may cause other actions, including printing, to take place. The term state refers to the status of an application or process. For example, the status of printer 16 includes, among items not listed, whether or not it is currently printing, whether or not it is malfunctioning, the number of pages it has printed, its toner level, its paper level, its network address, and its default print settings. The state of a computer 14 or 18 can refer to a program running on the computer 12 or 14 or its status.

Private link 20 represents generally any cable, wireless, or remote connection via a telecommunication link, an infrared link, a radio frequency link, and/or any other connector or system that provides electronic communication between state machines 14-18. Public link 24 represents generally any cable, wireless, or remote connection via a telecommunication link, an infrared link, a radio frequency link, and/or any other connector or system that enables electronic communication between remote computer 22 and state machines 14-18 of LAN 12. Public link 24 may, for example, be the Internet. The terms public and private are relative and, in this example, are taken from the perspective of LAN 12. Remote computer 22 may be part of a private network different from LAN 12.

Private Link 20 includes firewall 26. Firewall 26 represents any system designed to prevent unauthorized access to or from LAN 12. State machines 14-18 are protected by firewall 26 and can be described as being behind firewall 26. Remote computer 22 is outside the protection of firewall 26 and can be described as being outside firewall 26. More particularly, firewall 26 prevents a remote computer 22 from establishing a connection with state machines 14-18. However, state machines 14-18, from behind firewall 26, can establish a connection with remote computer 22. Once the connection is established by a particular state machine 14, 16, or 18, remote computer 22 can send data to and request data from that state machine.

Firewall 26 can be implemented in both hardware and software, or a combination of both. More specifically, firewall 26 is used to prevent unauthorized Internet users from accessing state machines 14-18. All messages entering or exiting LAN 12 pass through firewall 26. Firewall 26 examines each message and blocks those messages that do not meet specified security criteria. Firewall 26 may implement one or more of the following techniques:

Packet filtering: Firewall 26 looks at each packet entering or leaving LAN 12 and accepts or rejects a given packet based on user-defined rules.

Application gateway: Firewall 26 applies security mechanisms to specific applications, such as FTP (File Transfer Protocol) and telnet servers.

Circuit-level gateway: Firewall 26 applies security mechanisms when a TCP (Transmission Control Protocol) or UDP (User Datagram Protocol) connection is established. Once the connection has been made, packets can flow without further checking.

Proxy server: Firewall 26 intercepts all messages entering and leaving LAN 12 effectively hiding the true network addresses of devices 14-18.

Various embodiment of the present invention will allow a user operating remote computer 22 or programming running on remote computer 22 to traverse firewall 26 and initiate network connections with state machines 14-18. Once the connections are established, the state of each state machine 14-18 can be monitored and adjusted from outside LAN 12. For example, where a state machine is a printer with an embedded web server, a connection with that printer can be established and its status can be monitored by an administrator remotely located outside LAN 12. Where the state machine is a computer running a device management application such as Web JetAdmin, a connection with that computer can be established and the status of the network devices being managed can be monitored by an administrator remotely located outside LAN 12. The administrator may detect that a particular printer's toner level is low or that the printer is malfunctioning and then schedule a technician to remedy the identified problem. The administrator may also be able to send data over the connection to correct a problem or improve the performance of the printer.

Figure 2:
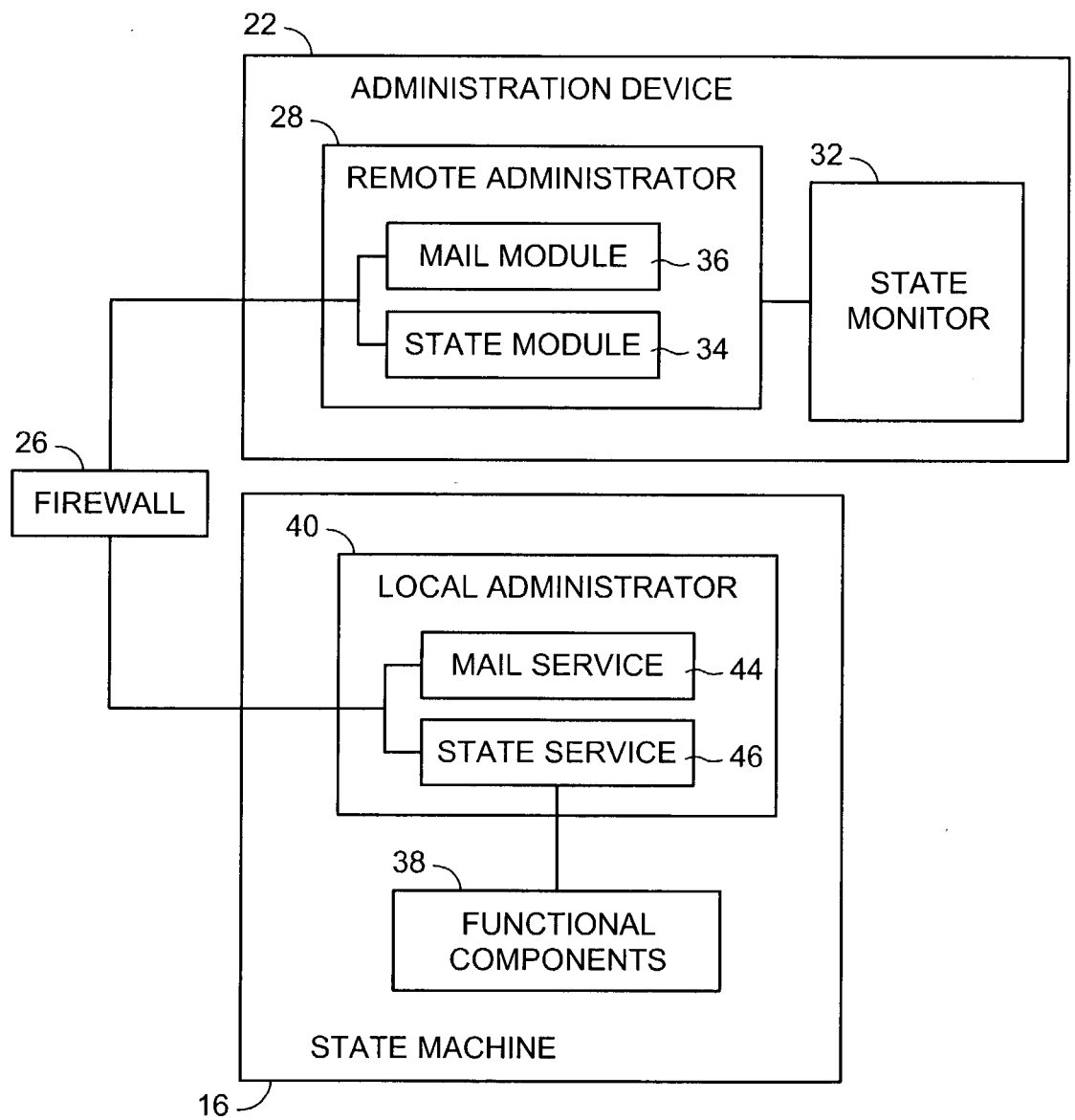
FIG. 2 is a block diagram illustrating the logical components of a state machine and a remote computer according to an embodiment of the present invention.

Components:

The logical components of one embodiment of the invention will now be described with reference to the block diagram of FIG. 2. In FIG. 2, remote computer 22 of FIG. 1 is labeled "administration device." Printer 16 of FIG. 1 is labeled generically "state machine." Remote computer 22 represents generally any computing device capable of network communications that is separated from state machine 16 by firewall 26.

While state machine 16 is allowed to establish a connection with remote computer 22, firewall 26 prevents remote computer 22 from directly establishing a network connection with state machine 16. Because electronic mail messages are typically assumed to be harmless, firewall 26 allows electronic mail messages to pass freely from remote computer 22 to state machine 16. Consequently, remote computer 22 can initiate a network connection and traverse firewall 26 by sending an electronic mail message to state machine 16, the mail message instructing state machine 16 to establish a network connection with remote computer 22. Once the connection is established, communications can continue between state machine 16 and remote computer 22 unfettered by firewall 26.

Remote computer 22 includes remote administrator 28 and state monitor 32. Remote administrator 28 represents generally any programming capable of initiating a network connection with state machine 16 in order to request, receive, adjust, and return state data. The term state data means electronic data representing the current status of a state machine, in this case state machine 16. While in the example of FIG. 2, state data is requested and received from state machine 16, remote administrator 22 is capable of requesting and receiving state data from one or more other state machines not shown.

In one embodiment, state monitor 32 represents generally any programming capable of processing state data received from state machine 16 by remote administrator 28 and taking action according set criteria. For example, where state machine 16 is a laser printer, state data received by remote administrator includes a toner level. When the toner level reaches a specified threshold, state monitor 32 may instruct that a new toner cartridge be ordered and delivered. The received state data may also indicate the number of pages printed. When that page count reaches a specified threshold, state monitor 32 may generate a message indicating that preventative maintenance is required.

In another embodiment, state monitor 32 represents generally any programming capable of generating a user interface allowing a user to monitor the state data. Where portions of the state data can be adjusted, state monitor 32 includes controls in the user interface that allows a user to adjust those portions.

Remote administrator 28 includes state module 34 and mail module 36. State module 34 represents any programming capable of requesting, adjusting, and returning adjusted state data. Where, as in this example, state machine 16 is a printer, it can have a number of configurable default settings relating to items such as duplexing, print resolution, paper source, and finishing operations such as collating and stapling. The state data for state machine 16 may indicate that by default, letter sized paper will be used, text and images will print at medium resolution on only one side of a sheet of paper, multiple copies will be collated, and printed pages will be output to a main paper bin. Once a connection is established between remote administrator 22 and state device 16, state module 34 may request and receive state data from state machine 16 and then adjust that state data to indicate that text and images will, by default, print at high resolution. When returning adjusted state data, state module 34 could return all state data but need only return the adjusted portions.

State data can be requested and sent and adjusted state data returned in a number of manners. Once a connection is established between remote administrator 28 and state machine 16, state data may be requested and sent and adjusted state data returned using SNMP (Simple Network Management Protocol). SNMP works by sending messages, called protocol data units (PDUs), to different parts of a network. An SNMP-compliant state machine stores state data in a Management Information Base (MIB) and returns this data to the SNMP requester, in this case, remote administrator 28. Remote administrator 28 can send adjusted state data by sending an SNMP message instructing state machine 16 to adjust its state. The established connection can take many forms. For example, the connection can be a TCP/IP (Transmission Control Protocol/Internet Protocol) connection. SNMP messages can be sent directly over the TCP/IP connection. For increased security, the SSL (Secure Sockets Layer) and/or S-HTTP (Secure Hypertext Transfer Protocol) may be used as a firewall-tunneling transport for instructions and data. Alternatively, a connection may be established by state machine 16 returning an electronic mail message to remote computer 22. In this case, SNMP messages can be included in or attached to electronic mail messages exchanged between remote computer 22 and state machine 16.

Mail module 36 represents generally any programming capable of generating and sending an electronic mail message to state machine 16. A generated message can serve a number of purposes. It can instruct state machine 16 to establish a connection with remote administrator 28 and direct when the connection is to be made. Where, for example, remote administrator 28 can be accessed through an IP (Internet Protocol) address, the mail message may merely contain that IP address. The message may also include credentials that indicate that the message originated from a known source as well as instructions indicating when the connection is to be made. A generated message can also serve as a vessel for returning adjusted state data. Where state data is received through electronic mail, mail module 36 is also responsible for forwarding the state data to state module 34.

State machine 16 includes functional components 38 and local administrator 40. Functional components 38 represent generally any combination of hardware and/or programming that implements the tasks for which state machine 16 was intended. Where, as in the current example, state machine 16 is a printer, functional components 38 are the hardware and programming responsible for printing pages of text and graphics. Local administrator 40 represents generally any programming capable of establishing a network connection with remote administrator 28 as well as monitoring and adjusting the state of functional components 38. For example, the state of functional components 38 may be reflected in a MIB. Local administrator 40 is then responsible for administering the device using the appropriate MIB. Continuing with the printer example, local administrator 40 is responsible for monitoring items such as toner levels and adjusting configurable settings relating to items such as the printer's default resolution and duplexing capabilities.

Local administrator 40 includes mail service 44 and state service 46. Mail service 44 represents any programming capable of receiving and processing electronic mail messages. Mail service 44 may also be responsible for validating credentials supplied with an electronic mail message before establishing a network connection. State service 46 represents any programming capable of establishing a network connection with remote administrator 28 as instructed in an electronic mail message, sending state data for functional components 38 over the connection, and adjusting the state of functional components 38. Where the state of functional components 38 is reflected in an MIB, state service 46 is responsible for retrieving state data using the MIB and sending the state data over an established connection. State service 46 is then also responsible for adjusting state data using the MIB as instructed by remote administrator 28.

Once a network connection is established between remote administrator 28 and local administrator 40, state module 34 using that connection, can request state data from state service 46. In response state service 46 assembles and sends state data reflecting the current state of functional components 38 over the connection to state service 34. If the state data is adjusted, state module 34 returns the adjusted portion back over the connection to state service 46 which in turn adjusts the state of functional components 38 as instructed.

Figure 3:
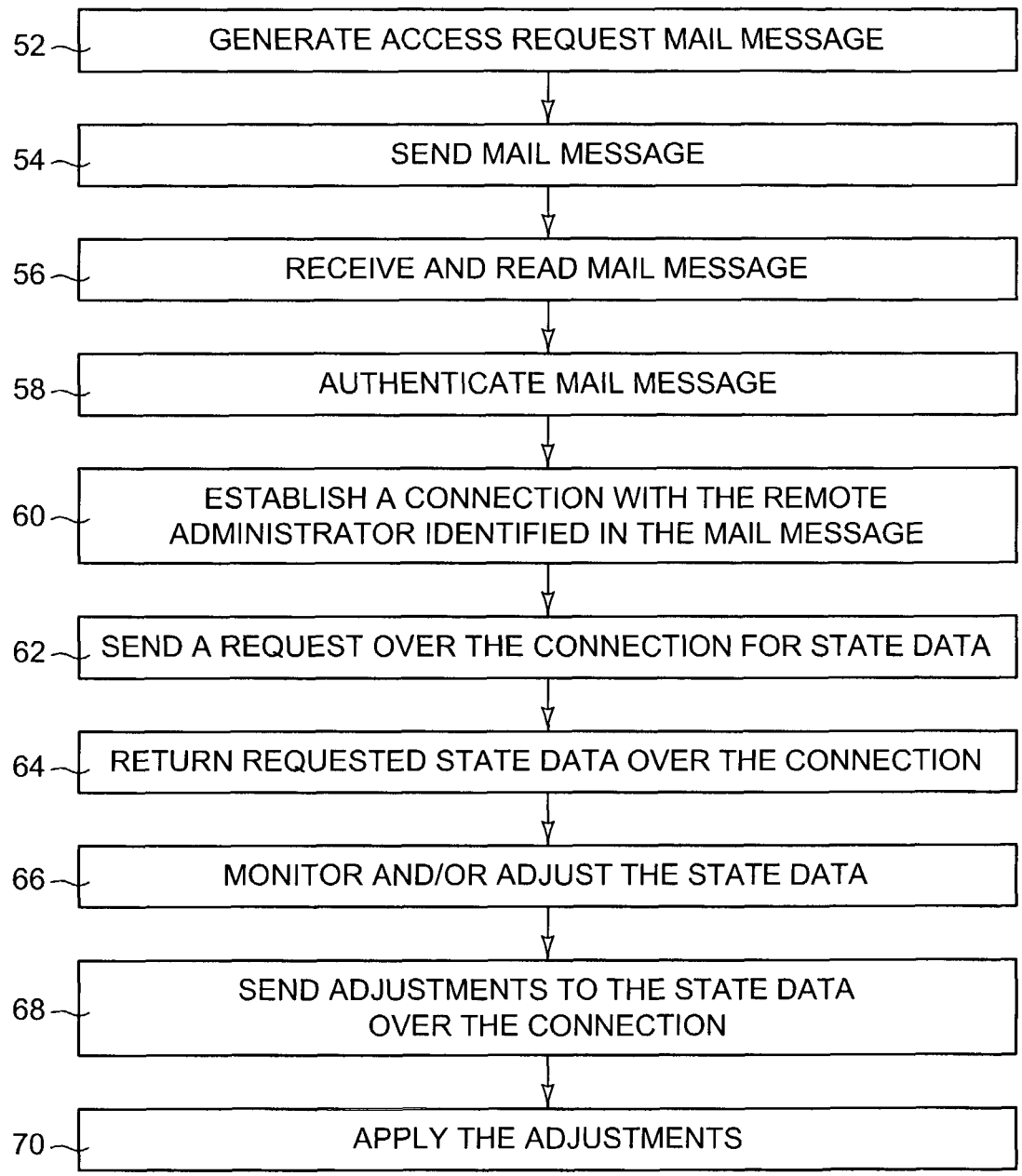
FIG. 3 is a flow diagram illustrating steps taken to traverse a firewall to establish a network connection for monitoring and adjusting state data according to an embodiment of the present invention.
Figure 4:
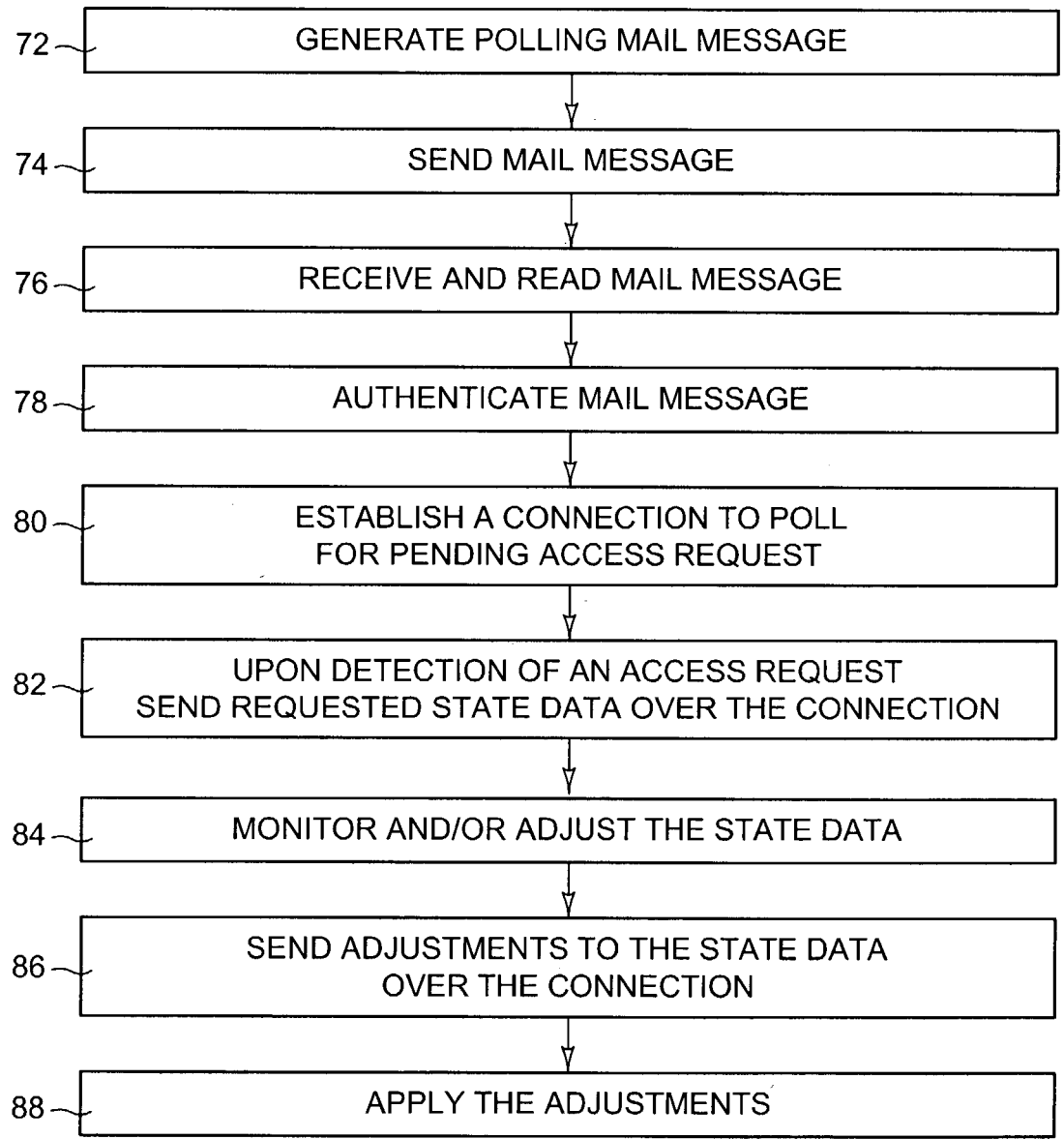
FIG. 4 is a flow diagram illustrating steps taken to traversing a firewall to establish a network connection for monitoring and adjusting state data according to another embodiment of the present invention.

Operation:

FIGS. 3 and 4 are flow diagrams that help to illustrate steps taken to traverse a firewall in order to establish a network connection for monitoring and managing a state machine according to various embodiments of the present invention.

Starting with FIG. 3, an access request mail message is generated and sent (steps 52 and 54). With reference to FIG. 2, an access request mail message is an electronic mail message containing instructions directing local administrator 40 of state machine 16 to establish a network connection with remote administrator 28 of remote computer 22. The access request mail message may simply include data identifying remote administrator 28 such as the network address for accessing remote administrator 28 or the electronic mail address for communicating with remote administrator 28. The access request mail message may also include other data. It may include credentials such as a digital signature for authenticating the source of the mail message. The mail message may include timing instructions. Timing instruction define when local administrator 40 is to establish a connection. To help load balance network communications, timing instruction may dictate that local administrator 40 is to establish a connection at two in the morning.

The access request mail message is received (step 56) and, if the message includes credentials, authenticated (step 58). A connection is then established with the remote administrator 28 identified in the access request mail message (step 60). For example, the connection may be established by opening a TCP/IP connection using an IP address contained in the mail message. Where the access request mail message does not contain credentials, the remote administrator 28 may be authenticated after the connection is established and before any other data is shared. The connection can instead be established by sending an electronic mail message to an address contained in the access request mail message. If the access request mail message includes timing instructions, the connection is established according to those timing instructions.

A request for state data is sent over the connection (step 62). This may involve sending an SNMP message over a TCP/IP connection to the state machine 16, or it may involve sending an electronic mail message containing the SNMP message to the state machine 16. Requested state data is then returned over the connection (step 64). This may involve returning an SNMP message over a TCP/IP connection to the remote administrator 28, or it may involve returning an electronic mail message containing the SNMP message to the remote administrator 28. The SNMP message used to request state data in step 62 may be included in the access request mail message generated in step 52. Similarly, state data requested in step 62 may be returned in the electronic mail message used to establish a connection in step 60.

The returned state data is monitored and/or adjusted (step 66). Step 66 can also be partially or completely automated. For example, state monitor 32, without user input, may monitor the state data and take action according to set criteria. State monitor 42 may generate a user interface that displays the state data. The user interface then includes controls for adjusting the portions of state data than can be configured.

Where the state data is adjusted, those adjustments are sent over the connection to local administrator 40 (step 68). Step 68 may involve sending an SNMP message in an electronic mail message or over a TCP/IP connection. Local administrator 40 then applies the adjustments (step 70).

FIG. 4 illustrates another approach to traversing a firewall. A polling mail message is generated and sent (steps 72 and 74). With reference to FIG. 2, a polling mail message is an electronic mail message containing instructions directing local administrator 40 of state machine 16 to periodically establish a network connection with remote administrator 28 of remote computer 22 to poll for a pending access request. In this example an access request is a request that local administrator 40 send state data to remote administrator. In contrast with the steps illustrated in FIG. 3, the access request is not sent to local administrator 40. Instead, local administrator 40, according to the instructions in the polling mail message, connects to remote administrator 28 to determine if an access request has been made.

A polling mail message includes polling instructions and data identifying remote administrator 28. Polling instructions are instructions directing the timing of when local administrator 40 establishes connection with remote administrator 28. For example, polling instruction may direct local administrator 40 to connect with remote administrator 28 every X hours between date Y and date Z. Data identifying remote administrator 28 may be a network address for accessing remote administrator 28 or the electronic mail address for communicating with remote administrator 28. The polling mail message may also include credentials such as a digital signature for authenticating the source of the polling mail message.

The polling mail message is received (step 76) and, if the message includes credentials, authenticated (step 78). A network connection is established with remote administrator 28 allowing remote administrator 28 to be polled for pending access requests (step 80). Following the detection of a pending access request, local administrator 40 sends state data to remote administrator 28 (step 82). Step 80 can be accomplished by opening a TCP/IP connection with remote administrator 28. If an access request is pending, remote administrator 28 sends a request for state data and local administrator 40 returns the requested state data over the opened connection to complete step 82.

The returned state data is monitored and/or adjusted (step 84). Step 84 can also be partially or completely automated. For example, state monitor 32, without user input, may monitor the state data and take action according to set criteria. State monitor 32 may generate a user interface that displays the state data. The user interface then includes controls for adjusting the portions of state data than can be configured. Where the state data is adjusted, those adjustments are sent over the connection to local administrator 40 (step 86). Local administrator 40 then applies the adjustments (step 88).

Conclusion:

Although the flow charts of FIGS. 3 and 4 each show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention can be embodied in any computer-readable media for use by or in connection with an instruction execution system such as a computer/processor based system or other system that can fetch or obtain the logic from the computer-readable media and execute the instructions contained therein. A "computer-readable media" can be any medium that can contain, store, or maintain programming for use by or in connection with the instruction execution system. The computer readable media can comprise any one of many physical media. Specific examples of a suitable computer-readable medium would include, but are not limited to, a portable magnetic computer diskette such as a floppy diskette or hard drive, a random access memory (RAM), a read-only memory (ROM), an erasable programmable read-only memory, a portable compact disc, or any combination thereof.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for traversing a firewall, the firewall preventing remote devices from accessing, but allowing remote devices to send electronic mail messages to, a plurality of local network devices, the method comprising:

receiving, by a network printer of the plurality of local network devices, an electronic mail message from a remote administrator device outside the firewall, the electronic mail message including an access request and credentials of the remote administrator device;

in response to receiving the electronic mail message, validating the credentials of the remote administrator device;

in response to validating the credentials, initiating, by the network printer, a connection with the remote administrator device through the firewall;

transmitting state data of the network printer to the remote administrator device over the initiated connection, the state data providing current status information of the network printer;

receiving adjusted state data from the remote administrator device, the adjusted state data providing at least one adjustment to be made to settings of the network printer; and based on the adjusted state data, implementing the at least one adjustment to the settings.

2. The method of claim 1, wherein the electronic mail message further includes a network address for the remote administrator device.

3. The method of claim 2, wherein the electronic mail message further includes timing instructions, and wherein initiating the connection includes using the network address for the remote administrator device and is performed according to the timing instructions.

4. The method of claim 1, wherein the network printer transmits the state data in response to a request from the remote administrator device.

5. The method of claim 1, wherein the current status information comprises toner levels and a number of pages printed by the network printer.

6. The method of claim 5, wherein the settings include duplexing, print resolution, paper source, and collating settings of the network printer.

7. A non-transitory computer-readable medium storing instructions for traversing a firewall, the firewall preventing remote devices from accessing, but allowing remote devices to send electronic mail messages to, a plurality of local network devices, wherein the instructions, when executed by at least one processor of a network printer of the plurality of local network devices, cause the network printer to:
   receive an electronic mail message from a remote administrator device outside the firewall, the electronic mail message including an access request and credentials of the remote administrator device;
   in response to receiving the electronic mail message, validate the credentials of the remote administrator device;
   in response to validating the credentials, initiate a connection with the remote administrator device through the firewall;
   transmit state data of the network printer to the remote administrator device over the initiated connection, the state data providing current status information of the network printer;
   receive adjusted state data from the remote administrator device, the adjusted state data providing at least one adjustment to be made to settings of the network printer; and
   based on the adjusted state data, implement the at least one adjustment to the settings.

8. The non-transitory computer-readable medium of claim 7, wherein the electronic mail message further includes a network address for the remote administrator device.

9. The non-transitory computer-readable medium of claim 8, wherein the electronic mail message further includes timing instructions, and wherein initiating the connection includes using the network address for the remote administrator device and is performed according to the timing instructions.

10. The non-transitory computer-readable medium of claim 7, wherein the network printer transmits the state data in response to a request from the remote administrator device.

11. The non-transitory computer-readable medium of claim 10, wherein the current status information comprises toner levels and a number of pages printed by the network printer.

12. The transitory computer-readable medium of claim 11, wherein the settings include duplexing, print resolution, paper source, and collating settings of the network printer.

13. A network printer comprised in a local network protected by a firewall, comprising:
   a processor; and
   at least one memory resource storing instructions that, when executed by the processor, cause the network printer to:
      receive an electronic mail message from a remote administrator device outside the firewall, the electronic mail message including an access request and credentials of the remote administrator device;
      in response to receiving the electronic mail message, validate the credentials of the remote administrator device;
      in response to validating the credentials, initiate a connection with the remote administrator device through the firewall;
      transmit state data of the network printer to the remote administrator device over the initiated connection, the state data providing current status information of the network printer;
      receive adjusted state data from the remote administrator device, the adjusted state data providing at least one adjustment to be made to settings of the network printer; and
      based on the adjusted state data, implement the at least one adjustment to the settings.

14. The local network device of claim 13, wherein the electronic mail message further includes a network address for the remote administrator device.

15. The local network device of claim 14, wherein the electronic mail message further includes timing instructions, and wherein initiating the connection includes and is performed using the network address for the remote administrator device and is performed according to the timing instructions.

16. The local network device of claim 13, wherein the network printer transmits the state data in response to a request from the remote administrator device.

17. The local network device of claim 16, wherein the current status information comprises toner levels and a number of pages printed by the network printer.

18. The local network device of claim 17, wherein the settings include duplexing, print resolution, paper source, and collating settings of the network printer.

* * * * *

UNITED STATES PATENT AND TRADEMARK OFFICE
CERTIFICATE OF CORRECTION

| | | |
|---|---|---|
| PATENT NO. | : 9,106,526 B2 | Page 1 of 1 |
| APPLICATION NO. | : 10/394643 | |
| DATED | : August 11, 2015 | |
| INVENTOR(S) | : Gregory Eugene Perkins et al. | |

It is certified that error appears in the above-identified patent and that said Letters Patent is hereby corrected as shown below:

Claims

In column 10, line 1, in Claim 12, delete "transitory" and insert -- non-transitory --, therefor.

Signed and Sealed this
Twenty-fourth Day of May, 2016

Michelle K. Lee
*Director of the United States Patent and Trademark Office*